US006815689B1

(12) United States Patent
McComas

(10) Patent No.: US 6,815,689 B1
(45) Date of Patent: Nov. 9, 2004

(54) MASS SPECTROMETRY WITH ENHANCED PARTICLE FLUX RANGE

(75) Inventor: David John McComas, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 68 days.

(21) Appl. No.: 10/016,187

(22) Filed: Dec. 12, 2001

(51) Int. Cl.[7] .......................... H01J 49/00; G01K 1/08; B01D 59/44

(52) U.S. Cl. ...................... 250/399; 250/398; 250/397; 250/287

(58) Field of Search ................................ 250/287, 397, 250/398, 399, 282, 281, 288, 289

(56) References Cited

U.S. PATENT DOCUMENTS

| | | | | | |
|---|---|---|---|---|---|
| 4,864,228 A | * | 9/1989 | Richardson | | 324/751 |
| 5,026,988 A | * | 6/1991 | Mendenhall et al. | | 250/287 |
| 5,168,158 A | * | 12/1992 | McComas et al. | | 250/287 |
| 5,202,561 A | | 4/1993 | Giessmann et al. | | 250/281 |
| 5,223,711 A | * | 6/1993 | Sanderson et al. | | 250/281 |
| 5,621,209 A | * | 4/1997 | Purser | | 250/296 |
| 5,654,544 A | | 8/1997 | Dresch | | 250/287 |
| 5,753,909 A | | 5/1998 | Park et al. | | 250/287 |
| 5,757,012 A | * | 5/1998 | Turner et al. | | 250/397 |
| 5,962,849 A | | 10/1999 | Saito et al. | | 250/287 |
| 6,011,259 A | | 1/2000 | Whitehouse et al. | | 250/287 |
| 6,051,831 A | | 4/2000 | Köster | | 250/281 |
| 6,057,545 A | | 5/2000 | Sugiyama | | 250/287 |
| 6,294,790 B1 | * | 9/2001 | Weinberger | | 250/397 |

* cited by examiner

*Primary Examiner*—John R. Lee
*Assistant Examiner*—Kalimah Fernandez
(74) *Attorney, Agent, or Firm*—Baker Botts L.L.P.

(57) ABSTRACT

A system and method for suppressing secondary electron counts in systems that count particles. The secondary electrons are produced in a foil or other secondary electron emitting surface. A suppression grid is placed in front of the particle detector. The grid is held at an applied voltage that prevents some portion of the electrons from being transmitted through the grid and reaching the detector. The applied voltage may be adjusted and varied in a manner that provides a predicable electron count and an enhanced dynamic range of measurements at the detector.

25 Claims, 1 Drawing Sheet

MASS SPECTROMETRY WITH ENHANCED PARTICLE FLUX RANGE

TECHNICAL FIELD OF THE INVENTION

This invention relates to instrumentation that involves particle counting, and more particularly to a time of flight mass spectrometer capable of handling a large dynamic range of ion fluxes.

BACKGROUND OF THE INVENTION

Mass spectrometers use the difference in mass-to-charge ratio (m/e) of ionized atoms or molecules to separate them from each other. Mass spectrometry is therefore useful for quantization of atoms or molecules and also for determining chemical and structural information about molecules. Molecules have distinctive fragmentation patterns that provide structural information to identify structural components.

Neutral mass spectrometers must first create gas-phase ions, whereas ion mass spectrometers analyze pre-existing ions. In either case, the ions are then separated in space or time based on their mass-to-charge ratio. Next, the quantity of ions of each mass-to-charge ratio is measured.

In general a mass spectrometer consists of an ionizer (neutral mass spectrometers only), a mass-selective analyzer, and an ion detector. The magnetic-sector, quadrupole, and time-of-flight designs also require extraction and acceleration ion optics to transfer ions from the source region into the mass analyzer.

A time-of-flight (TOF) mass spectrometer uses the differences in transit time through a drift region to separate ions of different masses. Some operate in a pulsed mode so ions must be produced or extracted in pulses, whereas other TOF mass spectrometers measure the times of single ions. An electric field accelerates all ions into a field-free drift region with a kinetic energy of qV, where q is the ion charge and V is the applied voltage. Lighter ions have a higher velocity than heavier ions and reach the detector at the end of the drift region sooner.

SUMMARY OF THE INVENTION

One aspect of the invention is a particle detection unit that detects secondary electrons produced in a foil or other emission surface. A detector, such as a microchannel plate detector is used to detect the electrons. A suppression grid is placed in the electron flight path in front of the detector. The grid is made from a conductive material and receives an applied voltage. The applied voltage is set to value that results in a known percentage of the secondary electrons being transmitted through the grid to be detected by the detector.

An advantage of the invention is that it may be used to increase the dynamic range of many types of particle counting instrumentation. More specifically, instruments whose maximum counting rates are limited may be equipped with a particle suppression grid in accordance with the invention, then used for particle fluxes that would otherwise exceed the maximum counting rate.

The invention is especially useful for space applications of time-of-flight mass spectrometers, but may be used for ground spectrometers and other particle counting instrumentation.

In addition to increasing dynamic range, the invention provides a means for maintaining calibration of the counting rate. The same source particles that are analyzed may be used for the calibration, that is, there is no need for any sort of external stimulus or calibration equipment.

DETAILED DESCRIPTION OF THE INVENTION

Figure 1:
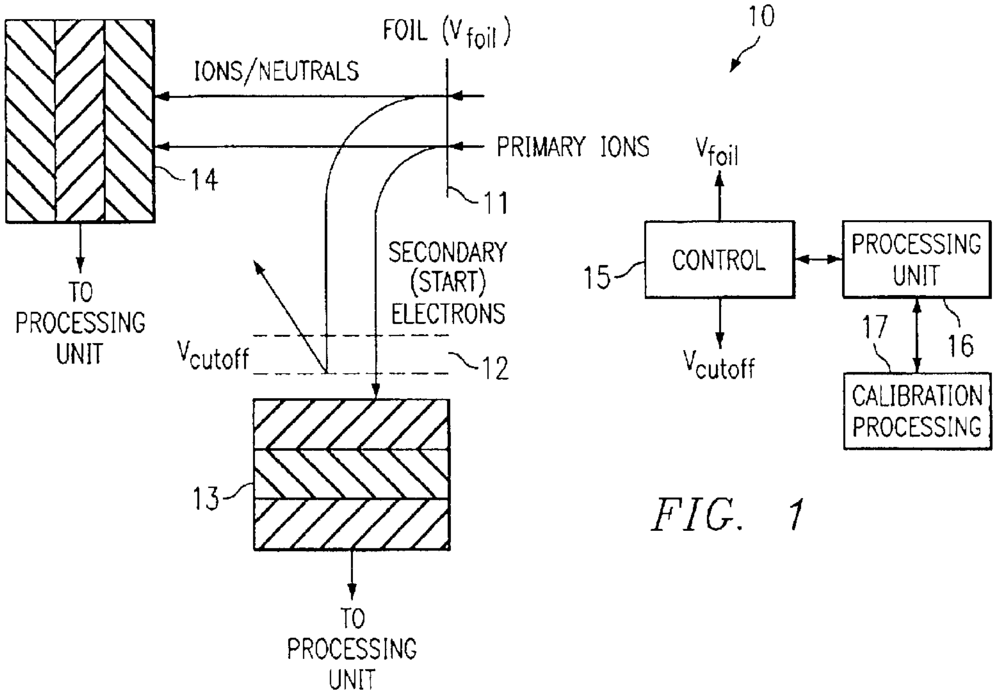
FIG. 1 illustrates a time-of-flight mass spectrometer having an electron suppression unit in accordance with the invention.

FIG. 1 illustrates a time of flight mass spectrometer 10 in accordance with the invention. For purposes of example, spectrometer 10 receives pre-existing ions, such as is the case for space applications. However, the invention is also applicable to time of flight mass spectrometers that use an ionizer. In general, spectrometer 10 is just one example of instrumentation that counts particles, and is thus one example of instrumentation to which the invention described herein may be applied.

Spectrometer 10 is a "single coincidence" spectrometer, meaning that a single start and a single stop per particle define an event. Primary ions enter the spectrometer 10 and pass through an ultra-thin foil 11, such as a carbon foil. The interaction of the ions and the foil 11 produces secondary electrons, which are emitted from the exit locations of the ions. The foil may be more generally referred to as a type of "secondary electron emission surface." These secondary electrons are electrically directed to a start detector 13 to provide a start signal. An example of a suitable start detector 13 is a microchannel plate.

A suppression grid 12 is placed in front of the start detector 13. As explained below, grid 12 permits only a fraction of the electrons to pass through and impinge on detector 13. Although typically, each primary particle that enters the spectrometer 10 provides only at most a few electrons, the number of primary particles may be quite high. The suppression of electrons by grid 12 prevents spectrometer 10 from being saturated in the case of high primary particle rates. Grid 12 is made from a highly transmissive conductive material, examples being nickel or gold.

The ions pass through the foil 11, traverse a drift space and impinge upon a stop detector 14. A microchannel plate may also be used for detector 14. Although some ions may become neutralized at foil 11, because the drift space has a small electric field, the times of flight are not much different for the ions and the neutrals.

The time lapse between the "start" pulse from the electron detector and the "stop" pulses from the stop detector 14 represents the time-of-flight of the respective ion. This time-of-flight is proportional to the square root of the ratio of the ion's mass over its charge.

If desired, the biasing of foil 11 may be used to reduce false start electrons. As shown in FIG. 1, foil 11 is held at a voltage, $V_{foil}$, which is more negative than any part of spectrometer 10 other than suppression grid 12. With sufficient biasing, the result is suppression of electrons arriving from anywhere other than from foil 11.

Electron suppression at grid 12 is achieved by applying a voltage, $V_{cutoff}$, to grid 12, where $V_{cutoff}$ is more negative than $V_{foil}$. Electron suppression by grid 12 is based on the fact that the electrons are emitted from foil 11 with a very low but highly repeatable energy distribution. As explained below, $V_{cutoff}$ may be adjusted so that only a known fraction of the secondary electrons that would otherwise reach detector 13 are transmitted through grid 12.

A control unit 15 may be used to provide appropriate voltage for $V_{cutoff}$ as well as $V_{foil}$, with appropriate control electronics for grid 12 and foil 11. Processing unit 16 receives the output of detectors 13 and 14 and may be programmed to analyze the output data and to implement various calibration techniques discussed below.

Figure 2:
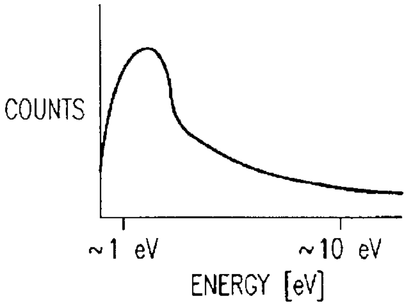
FIG. 2 illustrates the energy distribution of the electrons emitted by the foil of FIG. 1.

FIG. 2 illustrates the energy distribution of the electrons emitted by foil 11. As illustrated, this energy peaks at only a few electron volts (eV). This secondary electron spectrum is independent of the energy of the primary ions.

Figure 3:
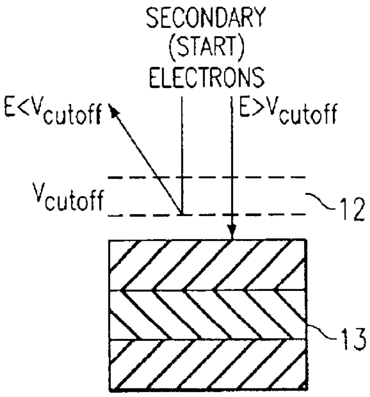
FIG. 3 illustrates how the grid of FIG. 1 may be used to suppress electrons that would otherwise be incident on the start detector.

FIG. 3 illustrates how grid 12 is used to suppress the count rate of start electrons that reach detector 13. A voltage, $V_{cutoff}$, is applied to grid 12, such that only the fraction of electrons that have sufficiently high energy, $E>V_{cutoff}$, pass through grid 12.

Figure 4:
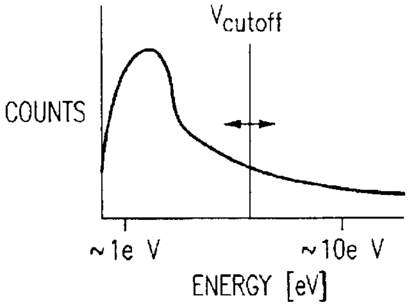
FIG. 4 illustrates how the voltage applied to the suppression grid may be varied to control electron suppression.

FIG. 4 illustrates how $V_{cutoff}$ may be varied to control the fraction of start electrons that pass through grid 12. The number of electrons with sufficiently high energy to pass through grid 12 is the area of the curve to the right of $V_{cutoff}$. As $V_{cutoff}$ is increased, the fraction of start electrons that reach detector 13 is reduced. In effect, grid 12 acts as a variable "electrostatic choke" on the count rate of start electrons.

Figure 5:
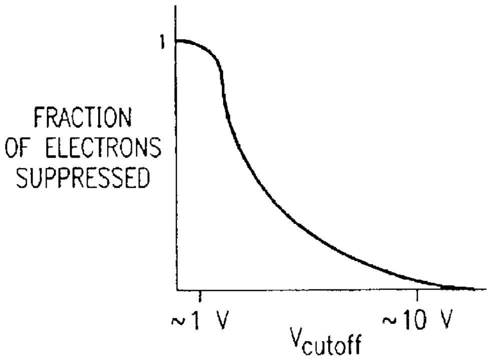
FIG. 5 illustrates the efficiency of the electron suppression as a function of the voltage applied to the suppression grid.

FIG. 5 illustrates the resulting efficiency of this throttling as a function of $V_{cutoff}$. As can be seen, grid 12 provides a controllable variable count efficiency. Like the curve of FIG. 4, the curve of FIG. 5 is predictable and particle independent.

The secondary electron suppression provided by grid 12 can be introduced anywhere along the electron flight path. Grid 12 may be placed immediately after foil 11 or just in front of detector 13. Also, additional grids could be used for additional throttling.

An alternative embodiment of spectroscope 10 could be equipped with a stop foil and stop detector for electrons produced on stop foil (not shown). This would permit secondary electrons to be produced and collected, to produce stop electrons and a stop signal, in a manner similar to the production of start electrons. This alternative embodiment could be further equipped with a suppression grid associated with the stop detector, which could be used to throttle the stop electrons in a manner similar to the above-described throttling of start electrons.

Using the above-described electron suppression method, it is expected that, if desired, more than 99% of the secondary electrons from foil 11 may be suppressed. Because of the nature of the electron emission curve of FIG. 5, it can be determined with accuracy, what percent of electrons are being detected at detector 13. Specifically, a particular value of $V_{cutoff}$ can be expected to suppress a known percent of electrons at grid 12.

The above-described method of electron suppression may also be used for purposes of calibrating the spectrometer 10. The same ions being analyzed may be used as the calibration source. Measurements that vary from the curves illustrated in FIGS. 4 and 5 indicate that the applied voltage, $V_{cutoff}$, may require calibration.

One approach to calibration is to scan the suppression voltage, $V_{cutoff}$, while ions are received at various constant fluxes. The secondary electron counting rates may be measured as a function of the suppression voltage.

Calibration may be also performed as a function of energy, to remove energy dependent effects. Or, calibration may be performed as a function of ion species, to remove species dependent effects. For ions of mixed species, calibration using the actual ions to be detected guarantees that the calibration is appropriate for the particular mixture of ions observed.

Because of the ease of calibration, routine calibrations may be incorporated into the normal data collection cycle of spectrometer 10. At any point in time, or at periodic intervals, the curves of FIG. 4 or 5 may be run to determine what counts were detected for the $V_{cutoff}$ that was set.

Measuring calibration factors as a function of energy may be used to increase the accuracy of the absolute count rate measurement. This is because the secondary electron emission curve, illustrated in FIG. 2, is extremely reproducible. This means that a fit to a known curve shape is used rather than simple count ratios. Reproducible discrepancies from this curve can provide an onboard internal measure of problems with the measurements, internal to spectrometer 10, such as errors in the applied voltage, or with the detector or counter.

Calibration is especially effective when combined with the use of separate stop and start channels. This approach is useful for space-based spectrometers, which often use a single stop channel in association with multiple start channels. The different start channels are used for effecting different viewing directions simultaneously. Comparison of start and stop rates provides improved knowledge of absolute calibration because the different channels provide independent measurements of the same incident ions.

As stated above, the particle suppression concepts described herein may be applied to any particle counting instrumentation. In fact, detector 13 and suppression grid 12 could be manufactured as a unit to be installed in such instruments. Appropriate voltage controls could be implemented. Two such units could be used in a time of flight spectrometer for counting both start and stop electrons.

Other Embodiments

Although the present invention has been described in detail, it should be understood that various changes, substitutions, and alterations can be made hereto without departing from the spirit and scope of the invention as defined by the appended claims.

What is claimed is:

1. A time-of-flight mass spectrometer that receives particles, comprising:

a secondary electron emission surface (SEES) for transmitting the particles and producing secondary electrons from the particles at the output side of the SEES;

a start detector for detecting electrons generated from the SEES;

a stop detector for detecting particles transmitted through the SEES; and at least one suppression grid placed in the electron flight path in front of the start detector, the grid being made from a conductive material such that it may receive an applied voltage and the grid operable to actively repel a portion of the electrons, such that they do not reach the start detector through the grid, with the portion of repelled electrons being determined by the amount of applied voltage.

2. The spectrometer of claim 1, further comprising control electronics for varying the voltage applied to the suppression grid.

3. The spectrometer of claim 1, wherein at least one of the start detector or stop detector is a microchannel plate.

4. The spectrometer of claim 1, further comprising a calibration unit programmed to perform calibration of the voltage applied to the suppression unit, based on data representing a known secondary electron emission curve.

5. The spectrometer of claim 1, further comprising a control unit for applying voltage to the SEES.

6. The spectrometer of claim 3, wherein the control electronics controls the proportion of electrons suppressed in accordance with a known secondary electron emission curve.

7. The spectrometer of claim 1, wherein the SEES is a foil.

8. The spectrometer of claim 1, wherein the spectrometer has multiple start channels, each having an SEES, start detector, and suppression grid.

9. A method of using a time-of-flight mass spectrometer to count particles, comprising:

transmitting particles through a secondary electron emission surface (SEES), such that the SEES produces secondary electrons from the particles at the output side of the SEES;

detecting the secondary electrons at a start detector;

detecting particles transmitted through the SEES at a stop detector; and placing a suppression grid in the electron flight path in front of the start detector, the grid being made from a conductive material such that it may receive an applied voltage and the grid operable to actively repel a portion of the electrons, such that they do not reach the start detector through the grid, with the portion of repelled electrons being determined by the amount of applied voltage.

10. The method of claim 9, wherein the method is a single coincidence method.

11. The method of claim 9, wherein the applied voltage is adjusted such that the start detector receives a known percentage of the electrons.

12. The method of claim 9, wherein the applied voltage is adjusted in accordance with known data representing counts of secondary electrons as a function of their electrical energy.

13. The method of claim 9, further comprising calibrating the applied voltage by periodically scanning a range of voltages applied to the suppression grid while receiving particles into the spectrometer at constant fluxes.

14. The method of claim 9, further comprising storing calibration data representing a count of electrons emitted by a secondary electron emission surface as a function of their electrical energy, and comparing count data to the calibration data.

15. The method of claim 14, further comprising measuring counts of the electrons received at the grid as a function of their energy, and comparing the measured data to stored calibration data.

16. The method of claim 14, further comprising measuring counts of the electrons received at the grid as a function of their species, and comparing the measured data to stored calibration data.

17. The method of claim 9, further comprising electrically biasing the SEES.

18. The method of claim 17, wherein the applied voltage to the grid is more negative than the bias applied to the SEES.

19. A time-of-flight mass spectrometer that receives particles, comprising:

a start detector for detecting particles received into the spectrometer;

a secondary electron emission surface (SEES) in the flight path of particles that were previously detected by the start detector, the SEES operable to transmit the particles and to produce stop electrons from the particles at the output side of the SEES;

a stop detector for detecting electrons generated by the SEES; and a suppression grid placed in an electron flight path in front of the stop detector, the grid being made from a conductive material such that it may receive an applied voltage and the grid operable to actively repel a portion of the electrons, such that they do not reach the stop detector through the grid, with the portion of repelled electrons being determined by the amount of applied voltage.

20. A method of using a time-of-flight mass spectrometer to count particles, comprising:

detecting particles received into the spectrometer at a start detector;

placing a secondary electron emission surface (SEES) in the flight path of particles that were previously detected by the start detector, the SEES operable to transmit the particles and to produce stop electrons from the particles at the output side of the SEES;

detecting electrons generated by the SEES at a stop detector; and placing a suppression grid in an electron flight path in front of the stop detector, the grid being made from a conductive material such that it may receive an applied voltage and the grid operable to actively repel a portion of the electrons, such that they do not reach the stop detector through the grid, with the portion of repelled electrons being determined by the amount of applied voltage.

21. The method of claim 20, further comprising calibrating the applied voltage by comparing measured count data with a stored secondary electron emission curve.

22. A time-of-flight mass spectrometer that receives particles, comprising:

a first secondary electron emission surface (SEES) for transmitting the particles and for producing start electrons from the particles at the output side of the first SEES;

a start detector for detecting electrons generated from the first SEES;

a first suppression grid placed in an electron flight path in front of the start detector, the grid being made from a conductive material such that it may receive an applied voltage and the grid operable to actively repel a portion of the electrons, such that they do not reach the start detector through the grid, with the portion of repelled electrons being determined by the amount of applied voltage;

a second secondary electron emission surface (SEES) for transmitting particles received from the first SEES and for producing stop electrons from the particles at the output side of the second SEES;

a stop detector for detecting electrons generated from the second SEES; and a second suppression grid placed in an electron flight path in front of the stop detector, the grid being made from a conductive material such that it may receive an applied voltage and the grid operable to actively repel a portion of the electrons, such that they do not reach the stop detector through the grid, with the portion of repelled electrons being determined by the amount of applied voltage.

23. The spectrometer of claim 22, wherein the spectrometer has multiple start channels, each having an SEES, start detector, and suppression grid.

24. A method of using a time-of-flight mass spectrometer to count particles, comprising:

transmitting the particles through a first secondary electron emission surface (SEES), such that the first SEES produces start electrons from the particles at the output side of the first SEES;

detecting electrons generated from the first SEES at a start detector, placing a first suppression grid in an electron flight path in front of the start detector, the grid being made from a conductive material such that it may receive an applied voltage and the grid operable to actively repel a portion of the electrons, such that they do not reach the start detector through the grid, with the portion of repelled electrons being determined by the amount of applied voltage;

transmitting particles transmitted through the first SEES through a second secondary electron emission surface (SEES), such that the second SEES produces stop electrons from the particles at the output side of the second SEES;

detecting electrons generated by the second SEES at a stop detector; and placing a second suppression grid in an electron flight path in front of the stop detector, the grid being made from a conductive material such that it may receive an applied voltage and the grid operable to actively repel a portion of the electrons, such that they do not reach the stop detector through the grid, with the portion of repelled electrons being determined by the amount of applied voltage.

25. The method of claim 24, further comprising calibrating the applied voltage by comparing measured count data with a stored secondary electron emission curve.

* * * * *